(12) United States Patent
Onozato et al.

(10) Patent No.: US 9,534,687 B2
(45) Date of Patent: Jan. 3, 2017

(54) VEHICLE CONTROL DEVICE AND CONTROL METHOD

(71) Applicant: Nissan Motor Co., Ltd., Kanagawa (JP)

(72) Inventors: Naoya Onozato, Kanagawa (JP); Masahiro Iriyama, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 14/907,642

(22) PCT Filed: May 15, 2014

(86) PCT No.: PCT/JP2014/062990
§ 371 (c)(1),
(2) Date: Jan. 26, 2016

(87) PCT Pub. No.: WO2015/015866
PCT Pub. Date: Feb. 5, 2015

(65) Prior Publication Data
US 2016/0169383 A1    Jun. 16, 2016

(30) Foreign Application Priority Data

Jul. 29, 2013  (JP) ................................ 2013-156863

(51) Int. Cl.
*B60W 10/06* (2006.01)
*B60W 10/101* (2012.01)
(Continued)

(52) U.S. Cl.
CPC ............ *F16H 61/702* (2013.01); *B60W 10/04* (2013.01); *B60W 10/06* (2013.01); *B60W 10/101* (2013.01); *B60W 10/107* (2013.01); *B60W 10/111* (2013.01); *F16H 59/74* (2013.01); *F16H 61/02* (2013.01); *F16H 61/0202* (2013.01); *F16H 61/66* (2013.01); *F16H 61/66259* (2013.01); *F16H 63/50* (2013.01); *B60W 2510/1025* (2013.01)

(58) Field of Classification Search
None
See application file for complete search history.

(56) References Cited

U.S. PATENT DOCUMENTS 5,468,196 A * 11/1995 Minowa ................ B60W 10/02
                                                477/107
2001/0021683 A1 * 9/2001 Takagi ................... B60W 10/06
                                                477/37

(Continued)

FOREIGN PATENT DOCUMENTS

| CN | 101846177 A | 9/2010 |
| JP | 05-079554 A | 3/1993 |
| JP | 2010-209946 A | 9/2010 |

*Primary Examiner* — Edwin A Young
(74) *Attorney, Agent, or Firm* — Osha Liang LLP

(57) ABSTRACT

A vehicle control device has a controller configured to control a hydraulic pressure required for shifting of a sub-transmission based on an input torque to the sub-transmission during the coordinated shift, and to execute limitation processing in which, when an instruction to execute specific control causing fluctuation in the input torque to the sub-transmission during the coordinated shift is issued, execution of the specific control is prohibited or the specific control is executed by limiting a control amount.

6 Claims, 4 Drawing Sheets

(51) Int. Cl.

| | |
|---|---|
| *B60W 10/11* | (2012.01) |
| *F16H 61/70* | (2006.01) |
| *B60W 10/04* | (2006.01) |
| *B60W 10/107* | (2012.01) |
| *F16H 59/74* | (2006.01) |
| *F16H 61/02* | (2006.01) |
| *F16H 61/66* | (2006.01) |
| *F16H 63/50* | (2006.01) |
| *F16H 61/662* | (2006.01) |
| *B60W 10/111* | (2012.01) |

(56) References Cited

U.S. PATENT DOCUMENTS

| | | | |
|---|---|---|---|
| 2002/0173391 A1* | 11/2002 | Endo | B60K 6/44 |
| | | | 474/18 |
| 2010/0227736 A1 | 9/2010 | Takahashi et al. | |
| 2010/0248886 A1 | 9/2010 | Jozaki et al. | |
| 2012/0135839 A1* | 5/2012 | Watanabe | B60W 30/18072 |
| | | | 477/110 |

* cited by examiner

VEHICLE CONTROL DEVICE AND CONTROL METHOD

CROSS-REFERENCE TO RELATED APPLICATIONS

This application is a national stage application of PCT/JP2014/062990, filed May 15, 2014, and claims priority to Japanese Patent Application NO. 2013-156863 filed on Jul. 29, 2013, which are herein incorporated by reference in the entirety.

BACKGROUND

Technical Field

The present invention relates to control of a vehicle having a continuously variable transmission with a sub-transmission.

Related Art

JP5-79554A discloses a continuously variable transmission with a sub-transmission. The continuously variable transmission with a sub-transmission can expand a realizable speed ratio range as an entire transmission by shifting the sub-transmission.

Moreover, when the sub-transmission is shifted, by performing coordinated shift for changing the speed ratio of the continuously variable transmission in a direction opposite to a change of the speed ratio of the sub-transmission, the change of the speed ratio of the entire transmission is suppressed, and a shift shock can be suppressed.

SUMMARY OF INVENTION

During the aforementioned coordinated shift, an actual hydraulic pressure supplied to friction elements of the sub-transmission is controlled so as to reach a target hydraulic pressure set on the basis of an input torque to the sub-transmission.

Thus, if the input torque to the sub-transmission is rapidly changed by a rapid change of an engine torque, an auxiliary machine load or the like during the coordinated shift, the actual hydraulic pressure supplied to the friction elements of the sub-transmission cannot catch up with the target hydraulic pressure which rapidly changes in accordance with the rapid change of the input torque, and engagement delay or disengagement delay of the friction elements of the sub-transmission causes drop/blow-up of engine rotation, and it is likely that a sense of discomfort is given to a driver.

One or more embodiments of the present invention suppresses disturbance in the coordinated shift upon receipt of the rapid change of the input torque into the sub-transmission during the coordinated shift in the continuously variable transmission with a sub-transmission.

According to one or more embodiments of the present invention, a vehicle control device, adapted to control a vehicle, including a continuously variable transmission and a stepped sub-transmission on a power transmission path from a power source to a driving wheel and executing coordinated shift in which, when the sub-transmission is to be shifted, a speed ratio of the continuously variable transmission is changed in a direction opposite to a changing direction of a speed ratio of the sub-transmission and suppressing a change in a speed ratio of the continuously variable transmission and the sub-transmission in entirety, is provided.

The vehicle control device controls a hydraulic pressure required for shifting of the sub-transmission based on an input torque to the sub-transmission during the coordinated shift, and execute limitation processing in which, when an instruction to execute specific control causing fluctuation in the input torque to the sub-transmission during the coordinated shift is issued, execution of the specific control is prohibited or the specific control is executed by limiting a control amount.

According to one or more embodiments of the present invention, a vehicle control method corresponding to the above-described the vehicle control device is provided.

DETAILED DESCRIPTION

Embodiments of the present invention will be described below by referring to the attached drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Figure 1:
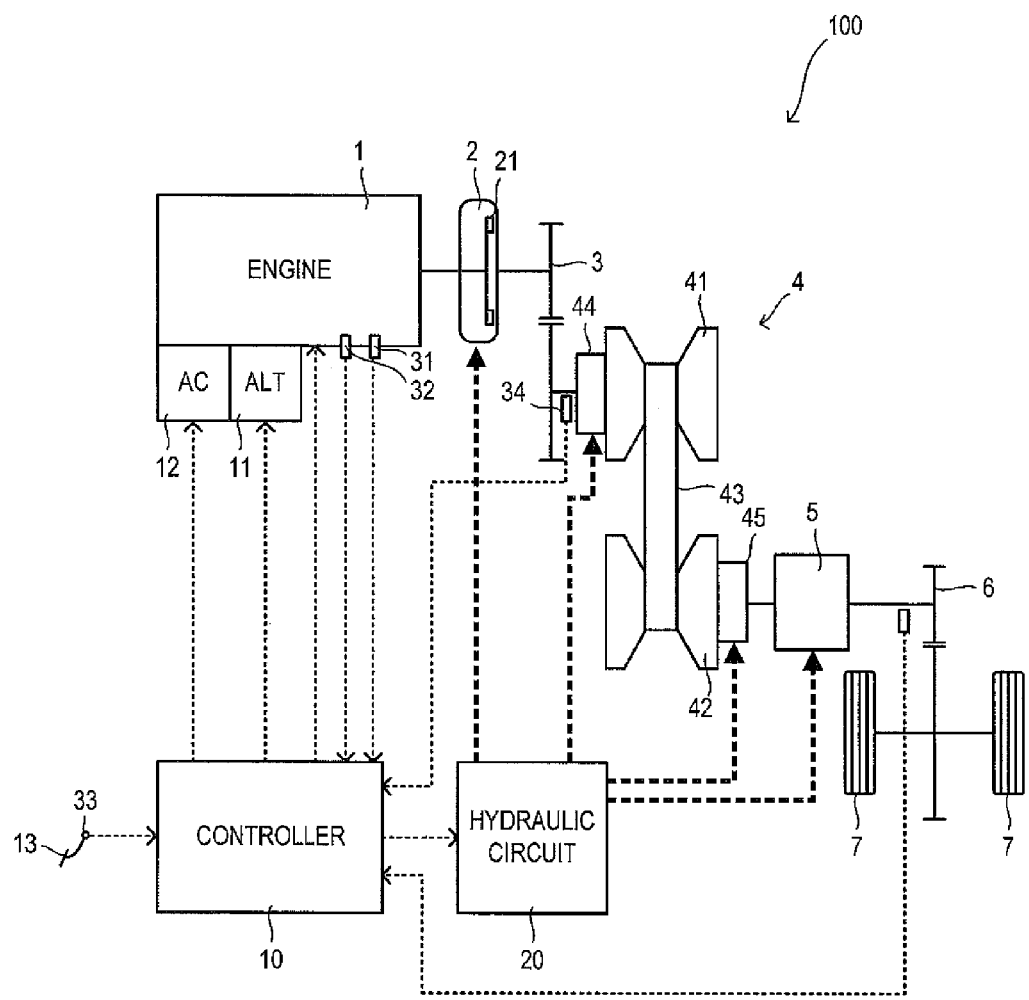
FIG. 1 is an outline constitution diagram of a vehicle to which one or more embodiments of the present invention is applied.

FIG. 1 illustrates an outline constitution diagram of a vehicle 100 according to one or more embodiments of the present invention. The vehicle 100 includes an engine 1 as a power source. A power train (power transmission path) for transmitting output rotation of the engine 1 to driving wheels 7 is constituted by a torque converter 2, a speed reduction gear train 3, a continuously variable transmission (hereinafter referred to as CVT) 4, a sub-transmission 5, and a final speed reduction gear train 6 disposed in order form the engine 1 side.

The engine 1 is a spark ignition type engine provided with a variable compression mechanism and a variable valve mechanism and has a fuel injection amount, an intake air amount, ignition timing, an EGR amount, opening/closing timing of intake/exhaust valves, a valve lift amount, a compression ratio and the like controlled by a controller 10 which will be described later. Moreover, to the engine 1, an alternator 11 and an air-conditioner compressor 12 for an air conditioner are connected through a belt, not shown, and a power generation state of the alternator 11 and an operation state of the air-conditioner compressor 12 are controlled by the controller 10 which will be described later.

A torque converter 2 is a torque converter having a lockup clutch 21 and is capable of switching between a converter state and a lock-up state in accordance with an engagement state of the lockup clutch 21. The engagement state of the lockup clutch 21 is changed by controlling a hydraulic pressure supplied from a hydraulic circuit 20 to the lockup clutch 21 by the controller 10 which will be described later. The lockup clutch 21 is disengaged when a vehicle speed is less than a lockup vehicle speed and is engaged at a speed equal to or higher than the lockup vehicle speed. Moreover, the lockup vehicle speed is switched depending on whether the air conditioner is on or off, and the lockup vehicle speed when the air conditioner is on is set higher than the lockup vehicle speed when the air conditioner is off.

The CVT 4 is constituted by a pair of pulleys 41 and 42 and a belt 43 wound around them, and by changing groove width of the pulleys 41 and 42 by hydraulic cylinders 44 and 45, a speed ratio can be continuously changed. The speed ratio of the CVT 4 is changed by controlling the hydraulic pressure supplied from the hydraulic circuit 20 to the hydraulic cylinders 44 and 45 by the controller 10 which will be described later.

The sub-transmission 5 is a stepped transmission with forward two speeds and a reverse one speed and is constituted by a Ravigneau type planetary gear mechanism in which carriers of two planetary gears are connected and a plurality of friction elements (Low brake, High clutch, Rev brake). The sub-transmission 5 can realize three gear positions, that is, first speed, second speed, and reverse by changing the engagement state of the plurality of friction elements. The gear position of the sub-transmission 5 is changed by control of the hydraulic pressure supplied from the hydraulic circuit 20 to the plurality of friction elements by the controller 10 which will be described later.

The hydraulic circuit 20 is constituted by a plurality of hydraulic control valves, generates a desired hydraulic pressure using a hydraulic pressure generated by an oil pump, not shown, as an original pressure and supplies this to a the lockup clutch 21, the hydraulic cylinders 44 and 45 of the pulleys 41 and 42, and each friction element of the sub-transmission 5.

The controller 10 is constituted by a CPU, storage devices such as a RAM and a ROM, an input/output interface and the like. To the controller 10, signals from a sensor 31 for detecting a rotation speed of the engine 1, a sensor 32 for detecting an intake air amount of the engine 1, a sensor 33 for detecting an opening degree of an accelerator pedal 13, a sensor 34 for detecting an input shaft rotation speed of the CVT 4, a sensor 35 for detecting a vehicle speed and the like are input. The controller 10 centrally controls the engine 1, the lockup clutch 21, the CVT 4, and the sub-transmission 5 on the basis of the input signals.

Particularly, when the sub-transmission 5 is to be shifted, the controller 10 suppresses a change in a speed ratio of the entire CVT 4 and sub-transmission 5 by performing coordinated shift for changing a speed ratio of the CVT 4 in a direction opposite to a direction in which a speed ratio of the sub-transmission 5 changes so as to suppress a shift shock when the sub-transmission 5 is shifted.

In this coordinated shift, if lowering of a hydraulic pressure of a disengagement-side friction element is too early or rising of the hydraulic pressure of an engagement-side friction element is too late, blow-up of the engine 1 occurs, while if lowering of the hydraulic pressure of the disengagement-side friction element is too late or the rising of the hydraulic pressure of the engagement-side friction element is too early, drop in rotation of the engine 1 occurs. Therefore, the controller 10 sets a target value of an actual hydraulic pressure supplied to each of the friction elements on the basis of the input torque to the sub-transmission 5 and controls the actual hydraulic pressure so that the actual hydraulic pressure reaches the set target hydraulic pressure.

In the constitution in which the hydraulic pressure supplied to each of the friction elements is controlled on the basis of the input torque to the sub-transmission 5 as described above, a rapid change of the input torque to the sub-transmission 5 caused by a rapid change of the engine torque, an auxiliary machine load or the like during the coordinated shift needs to be prevented. That is because, if the input torque to the sub-transmission 5 rapidly changes, the target value of the actual hydraulic pressure supplied to each of the friction elements rapidly changes, but the actual hydraulic pressure cannot catch up with the rapidly changing target hydraulic pressure and as a result, the coordinated shift is disturbed, and drop/blow-up of the rotation of the engine 1 occurs, whereby a sense of discomfort is given to the driver.

Thus, in one or more embodiments of the present invention, as will be described below, during the coordinated shift, if an instruction to execute specific control causing a rapid change in the input torque to the sub-transmission 5 is issued in relation with the control of the engine 1, the CVT 4 and the like, limitation processing in which the controller 10 does not execute the specific control or its control amount is limited in execution is performed.

Then, the controller 10 continues this limitation processing until the coordinated shift is finished, and after the coordinated shift is finished, if the specific control is still needed, the specific control is resumed or the limited control amount is recovered to the original.

The specific control refers to various types of control for causing the rapid change of the input torque to the sub-transmission 5 and the specific control includes the following controls, for example:

Execution of fuel cut of the engine 1 or recovery from the fuel cut state;

Rapid (stepped) change of ignition timing of the engine 1;

Change of an operation state of a device (throttle, variable valve, EGR valve, electric waste gate, bypass valve of supercharger, variable compression ratio mechanism and the like) changing an intake air amount of the engine 1; and Change of operation state of an auxiliary machine (alternator 11, air-conditioner compressor 12 and the like)

Figure 2:
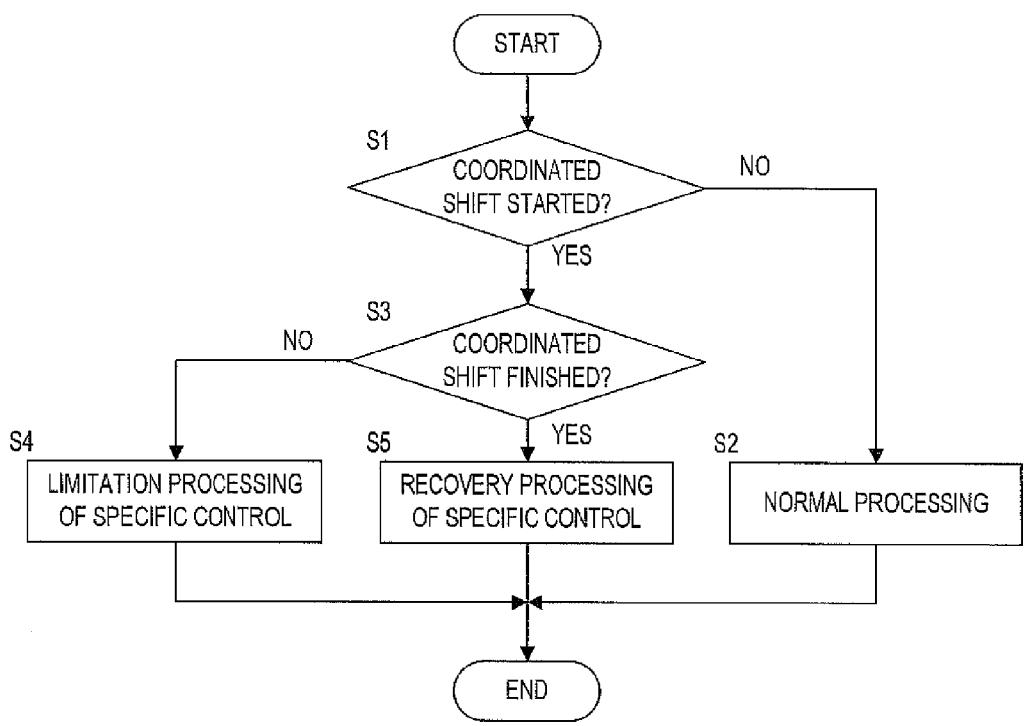
FIG. 2 is a flowchart illustrating contents of limitation processing.

FIG. 2 is a flowchart illustrating contents of limitation processing executed by the controller 10 and details of the limitation processing will be described by referring to that. This flowchart is repeatedly executed for a predetermined time cycle (10 msec cycle, for example) in the controller 10.

According to this, first, at S1, the controller 10 determines whether or not the coordinated shift has been started. The coordinated shift is started in order to shift up the sub-transmission 5 from the first speed to the second speed when a speed ratio of the CVT 4 reaches the most High speed ratio, for example. If the coordinated shift has not been started, the processing proceeds to S2, and limitation of the specific control is not executed (normal processing).

If the coordinated shift has been started, the processing proceeds to S3, and the controller 10 determines whether or not the coordinated shift has been finished. If the coordinated shift has not been finished, that is, during the coordinated shift, the processing proceeds to S4, and the limitation processing for limiting the specific control is executed.

In this limitation processing, specifically, the controller 10 makes either of limitations (1) and (2) below.

(1) Even if an instruction to execute specific control is issued, execution of the specific control is prohibited, and the specific control is not executed. For example, even if the instruction to execute the fuel cut is received, the controller 10 does not perform the fuel cut.

(2) When an instruction to execute the specific control is issued, a control amount is limited to a value smaller than a control amount corresponding to the instruction and the specific control is executed so that fluctuation of the input torque to the sub-transmission 5 by the specific control is made smaller. Limitation of the control amount includes limitation of not only the control amount of the specific control to the value smaller than the control amount corresponding to the instruction but also a change speed (control amount per unit time) to the control amount corresponding to the instruction and the like. For example, when the controller 10 receives the instruction to advance the ignition timing of the engine 1, the controller 10 limits the change speed of the ignition timing and gently advances the ignition timing to the target ignition timing.

According to the limitation processing, even if the instruction to execute the specific control is issued, the specific control is not executed or executed with the limited control amount and thus, a rapid change of the input torque to the sub-transmission 5 is suppressed, and drop/blow-up of rotation of the engine 1 caused by disturbed coordinated shift can be suppressed.

The limitation processing is continued while the processing proceeds to S1, S3, and S4, that is, while the coordinated shift is being executed.

If it is determined at S3 that the coordinated shift is finished, the processing proceeds to S5, and the controller 10 finishes the limitation processing of the specific control. Then, if it is determined that the specific control which became the target of the limitation processing is present and the specific control is still needed even after the coordinated shift is finished, the controller 10 executes recovery processing to resume the specific control whose execution was prohibited in the limitation processing or to recover the limited control amount to the original.

The specific control which was prohibited or whose control amount was limited during the coordinated shift is originally a required control in controlling the vehicle 100 though it causes disturbance in the coordinated shift. Therefore, by limiting the limitation processing of the specific control until the end of the coordinated shift, limitation of the specific control is kept within a required range, and demerits caused by the limitation of the specific control is kept as small as possible. Moreover, by resuming the specific control which was prohibited after the coordinated shift or by recovering the limited control amount to the original, an effect (reduction of a fuel consumption amount by fuel cut and the like) intended by the specific control can be obtained after the coordinated shift.

On the other hand, in a case in which, though the limitation processing was executed upon receipt of the instruction to execute the specific control during the coordinated shift, there is no instruction left for executing the specific control after the coordinated shift is finished, the specific control is no longer needed and thus, the controller 10 does not resume the prohibited specific control or recover the limited control amount to the original.

For example, if the driver steps on the accelerator pedal 13 during the coordinated shift, a change in an opening degree of the throttle is prohibited or an opening-degree change amount is made smaller by the limitation processing than that in the case of stepping-on, but if the driver does not step on the accelerator pedal 13 after the coordinated shift, there is no need to change the opening degree of the throttle, and the controller 10 does not change the throttle opening degree even after the coordinated shift is finished.

As a result, such a situation can be prevented that unnecessary control is executed after the coordinated shift is finished, which deteriorates fuel efficiency or exhaust performances and gives a sense of discomfort to the driver.

If there are a plurality of specific controls limited in the limitation control, they are resumed or limited control amounts are recovered at each timing shifted from each other to the original. As a result, a rapid change in an engine torque and the like caused by resumption of the plurality of specific controls at once or recovery of the limited control amounts to the original at once can be suppressed, and a sense of discomfort given to the driver caused by a change in a vehicle behavior can be prevented.

At this time, the order of resumption or recovery of the limited control amount to the original is determined such that, first, each of the specific controls is arranged in order not causing interference among controls and then, if there are a plurality of the specific controls at the same rank, they are arranged in order from the one with a smaller fluctuation width of the input torque to the sub-transmission 5 caused by the resumption or recovery of the limited control amount to the original.

By resuming the plurality of specific controls or by recovering the limited control amounts to the original in the order as described above, a change in the vehicle behavior immediately after the coordinated shift is finished is suppressed while interference among controls is prevented.

For example, regarding the operation of the air-conditioner compressor 12 and the fuel cut, if they are performed in the order of the fuel cut and the operation of the air-conditioner compressor 12 when the vehicle speed is in a specific vehicle speed region between a lockup vehicle speed when the air conditioner is ON and a lockup vehicle speed when the air conditioner is OFF (< lockup vehicle speed when the air conditioner is ON), control interference occurs. The lockup vehicle speed is a vehicle speed at which the engagement state of the lockup clutch 21 is switched, and at a vehicle speed less than the lockup vehicle speed, the lockup clutch 21 is disengaged, while at the vehicle speed not lower than the lockup vehicle speed, the lockup clutch 21 is engaged. Such interference occurs because, if the air-conditioner compressor 12 is operated in the aforementioned specific vehicle speed region, the lockup vehicle speed is changed from the one when the air conditioner is OFF to the one when the air conditioner is ON, the vehicle speed falls below the lockup vehicle speed, and the lockup clutch 21 is disengaged, but if the lockup clutch 21 is disengaged, the rotation speed of the engine 1 falls to a fuel-cut recovery rotation speed, and a fuel-cut recovery instruction to maintain the rotation speed of the engine 1 is issued so that fuel injection is resumed. If such interference occurs, control hunting that the fuel injection is resumed immediately after the execution of the fuel cut occurs, whereby the torque of the engine 1 is rapidly changed, and a shock occurs.

On the other hand, by executing the fuel cut after the air-conditioner compressor 12 is operated, such interference does not occur. That is because, if the air-conditioner compressor 12 is operated when the vehicle speed is in the aforementioned specific vehicle speed region, the lockup vehicle speed is changed, whereby the lockup clutch 21 is disengaged, and the rotation speed of the engine 1 falls to the fuel-cut recovery rotation speed, and the fuel-cut recovery instruction is issued so that the fuel cut is prohibited. That is, since resumption timing of the fuel cut is delayed, even if the instruction to resume the fuel cut is issued after the timing when the fuel cut is prohibited, the prohibition of the fuel cut is given priority, and the fuel cut is not executed, whereby the aforementioned control hunting can be prevented.

Therefore, if the operation of the air-conditioner compressor 12 and the fuel cut are included in the specific control for resumption or recovery of the limited control amount to the original, the controller 10 executes the control in the order of the operation of the air-conditioner compressor 12 and the fuel cut.

Subsequently, execution of the aforementioned limitation processing will be described.

Figure 3:
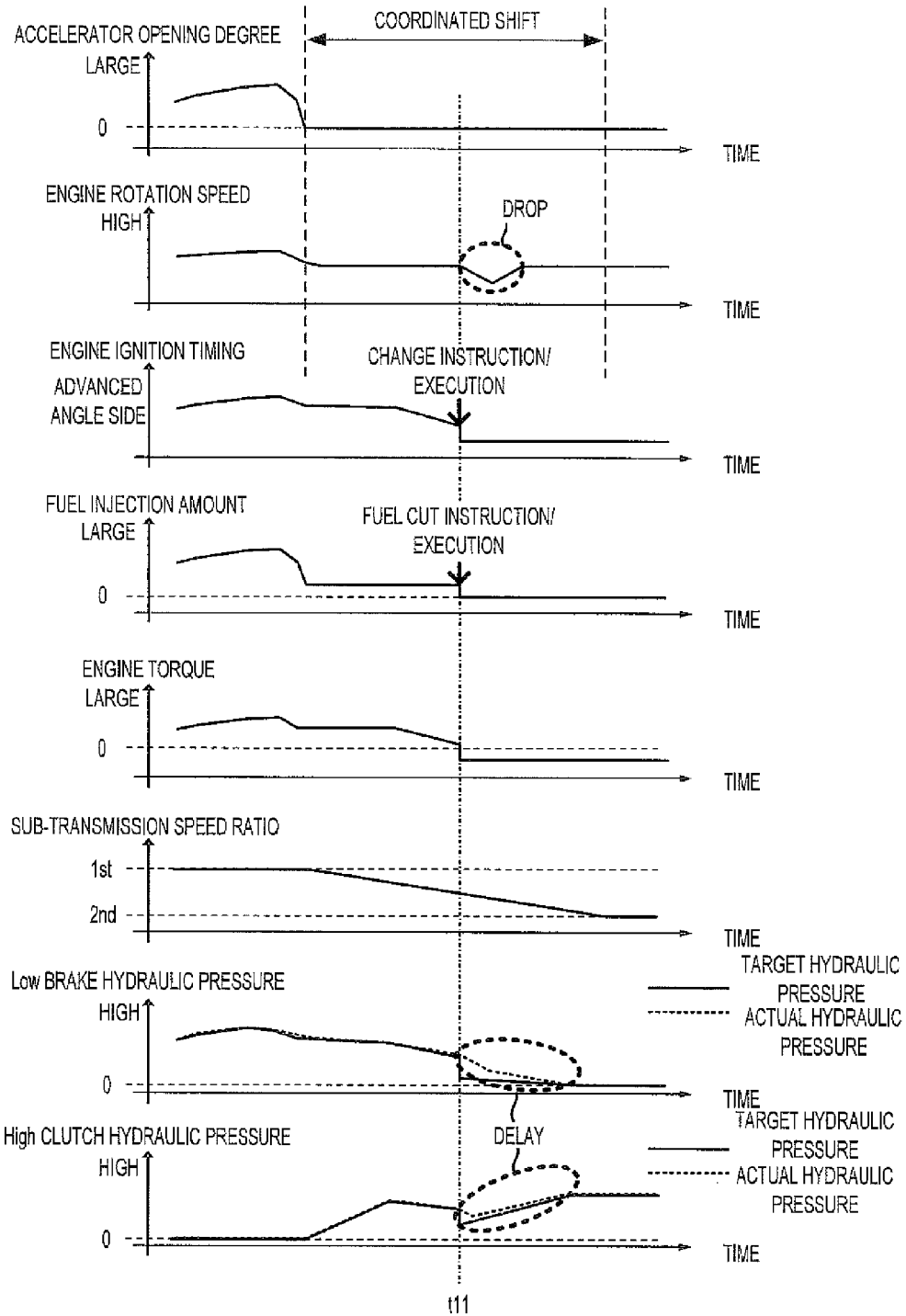
FIG. 3 is a time chart in a comparative example when a fuel cut and a change in ignition timing are performed during coordinated shift.

FIG. 3 illustrates a state in which, though the fuel cut and a change of the ignition timing are performed as specific control during the coordinated shift for shifting the sub-transmission 5 from the first speed to the second speed, the aforementioned limitation processing is not executed (comparative example).

When the fuel cut and the change of the ignition timing are performed, the torque of the engine 1 rapidly changes to the negative side, and the input torque to the sub-transmission 5 also rapidly changes to the negative side (time t11).

Upon this, target hydraulic pressures of both the Low brake which is the disengagement-side friction element and the High clutch which is the engagement-side friction element rapidly decrease, but particularly in this example, the actual hydraulic pressure supplied to the Low brake is delayed with respect to the target hydraulic pressure, and disengagement of the Low brake is delayed and thus, a drop in the rotation of the engine 1 occurs (time t 11 and after). The drop in the rotation of the engine 1 incurs a change in the vehicle behavior and causes a sense of discomfort given to the driver.

Figure 4:
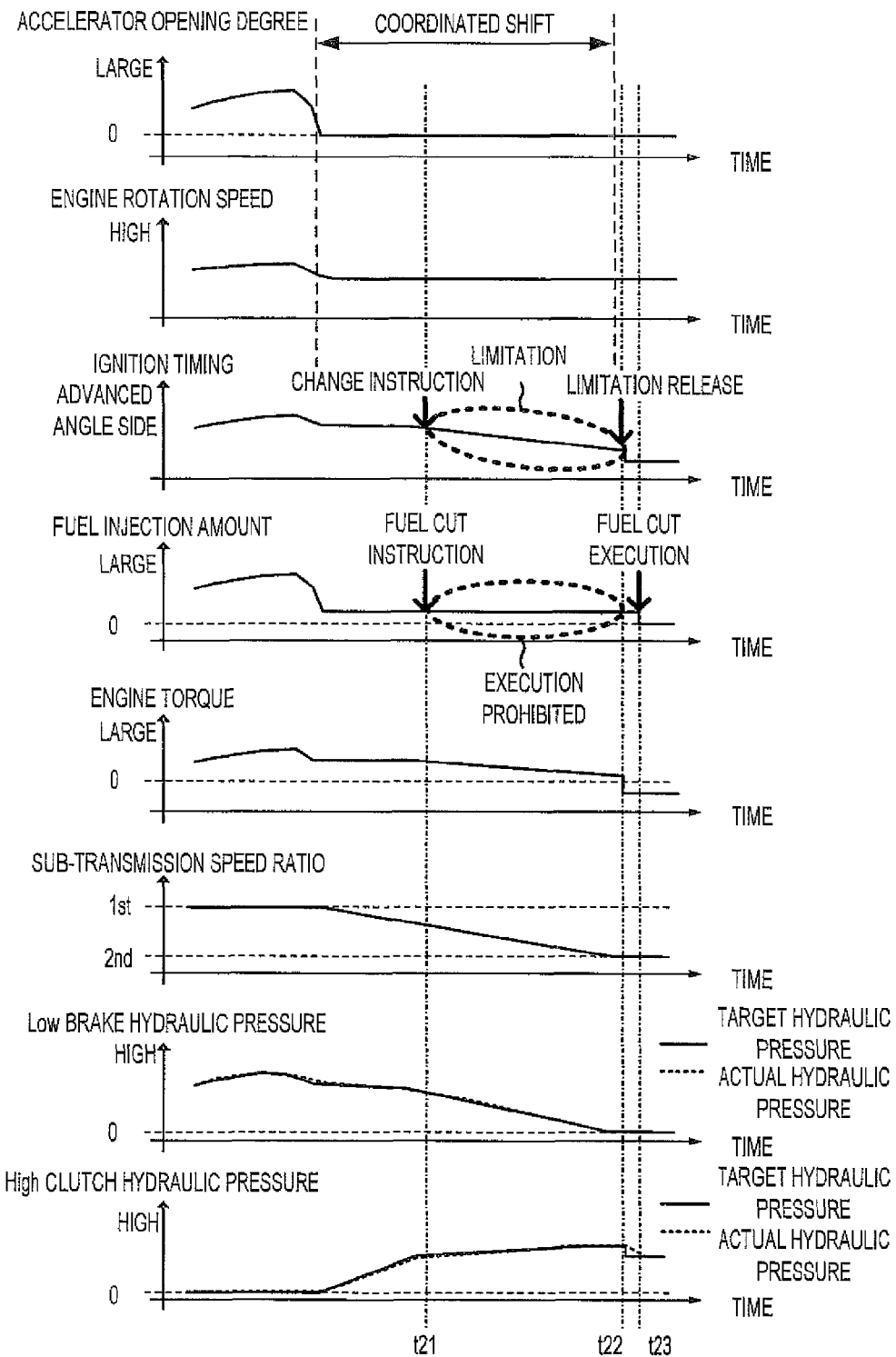
FIG. 4 is a time chart according to one or more embodiments of the present invention, when the fuel cut and the change in ignition timing are performed during coordinated shift.

On the other hand, FIG. 4 illustrates a state in which the fuel cut and the change of the ignition timing are performed as the specific control during the coordinated shift for shifting the sub-transmission 5 from the first speed to the second speed, and the control is limited by the aforementioned limitation processing, according to one or more embodiments of the present invention.

According to the aforementioned limitation processing, even if the fuel cut and the change of the ignition timing are instructed during the coordinated shift, the execution of the fuel cut is prohibited and fuel injection is continued, and also, the ignition timing is changed gently, and thus, a change of the torque of the engine 1 caused by them is suppressed, and the change of the input torque to the sub-transmission 5 is suppressed (time t21 to t22).

As a result, changes of the target hydraulic pressures of the Low brake and the High clutch also become gentle, and the actual hydraulic pressures supplied to them can catch up with the target hydraulic pressure without delay, and a drop/blow-up of the rotation of the engine 1 caused by disturbance of the coordinated shift can be suppressed.

Moreover, by shifting the timing when the fuel cut which has been prohibited during the coordinated shift is resumed (time t22) and the timing when the ignition timing which has been gently changed is changed to the ignition timing corresponding to the instruction (time t23), a change in the vehicle behavior immediately after the coordinated shift is finished is suppressed (time t22 to t23).

In one or more embodiments of the present invention, during the coordinated shift, if an instruction is issued that the hydraulic pressure required for shifting the sub-transmission 5 is controlled on the basis of the input torque to the sub-transmission 5 and the specific control for causing fluctuation in the input torque to the sub-transmission 5 is executed during the coordinated shift, execution of the specific control is prohibited. Alternatively, the limitation processing of executing the specific control by limiting the control amount is executed.

By means of the limitation processing, the fluctuation in the input torque to the sub-transmission 5 during the coordinated shift can be suppressed, and thus, fluctuation of the hydraulic pressure required for shifting of the sub-transmission 5 can be suppressed, and disturbance of the coordinated shift caused by a delay in the actual hydraulic pressure with respect to the required hydraulic pressure can be suppressed. As a result, drop/blow-up of the rotation of the engine 1 can be suppressed, and a change in the vehicle behavior is prevented from giving a sense of discomfort to the driver.

Moreover, it is so configured that the limitation processing is executed until the coordinated shift is finished, and after the coordinated shift is finished, the limitation processing is not executed. The specific control which was prohibited or whose control amount was limited during the coordinated shift is originally a required control, though it causes disturbance in the coordinated shift. Therefore, by limiting the limitation of the specific control until the coordinated shift is finished, limitation of the specific control is kept within a required range, and demerits caused by the absence of exertion of the effect intended by the specific control can be kept as small as possible.

Moreover, since the specific control is originally a required control, recovery processing in which the specific control which was prohibited is resumed after the coordinated shift is finished or the limited control amount is recovered to the original is executed. As a result, the effect intended by the specific control can be obtained after the coordinated shift is finished.

Moreover, if there are a plurality of specific controls to be resumed or whose limited control amounts are to be recovered to the original after the coordinated shift is finished, the timing of the resumption or when the control amount is recovered to the original is shifted from each other. As a result, a change in the torque of the engine 1 and the like, resulting in a rapid change in the vehicle behavior caused by resumption of the plurality of specific controls at once or recovery of the plurality of limited control amounts to the original at once can be suppressed, and a sense of discomfort given to the driver can be prevented.

Moreover, in shifting the timing, it is configured such that resumption or recovery of the control amount to the original is performed in order from the specific control with a smaller fluctuation width of the input torque in the sub-transmission 5 causes by resumption or recovery of the control amount to the original. As a result, the torque change of the engine 1 after the coordinated shift is finished becomes gentle, and the sense of discomfort to the driver caused by the rapid change in the vehicle behavior can be further suppressed.

Moreover, it is configured such that the resumption or recovery of the control amount to the original is performed in such order that the plurality of specific controls do not interfere with each other. As a result, unstableness of the control caused by interference among controls can be prevented, and the vehicle behavior after the coordinated shift is finished can be made stable.

Specific embodiments of the present invention are described above, but the aforementioned embodiments merely illustrates a part of application examples of the present invention, and are not intended to limit the technical range of the present invention to the specific configuration of the aforementioned embodiments.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A vehicle control device, adapted to control a vehicle, including a continuously variable transmission and a stepped sub-transmission on a power transmission path from a power source to a driving wheel and executing coordinated shift in which, when the sub-transmission is to be shifted, a speed ratio of the continuously variable transmission is changed in a direction opposite to a changing direction of a speed ratio of the sub-transmission and suppressing a change in a speed ratio of the continuously variable transmission and the sub-transmission in entirety, the vehicle control device comprising:
a controller configured to:
control a hydraulic pressure required for shifting of the sub-transmission based on an input torque to the sub-transmission during the coordinated shift, and
execute limitation processing in which, when an instruction to execute specific control causing fluctuation in the input torque to the sub-transmission during the coordinated shift is issued, execution of the specific control is prohibited or the specific control is executed by limiting a control amount.

2. The vehicle control device according to claim 1, wherein the controller executes the limitation processing until the coordinated shift is finished and does not execute the limitation processing after the coordinated shift is finished.

3. The vehicle control device according to claim 2, wherein the controller resumes the specific control which was prohibited or to recover the control amount which was limited after the coordinated shift is finished.

4. The vehicle control device according to claim 3, wherein, when there are a plurality of the specific controls to be resumed or whose limited control amounts are to be recovered after the coordinated shift is finished, the controller shifts timing of resumption or recovery of the control amounts from each other.

5. A vehicle control method of a vehicle including a continuously variable transmission and a stepped sub-transmission on a power transmission path from a power source to a driving wheel and executing coordinated shift in which, when the sub-transmission is to be shifted, a speed ratio of the continuously variable transmission is changed in a direction opposite to a changing direction of a speed ratio of the sub-transmission and suppressing a change in a speed ratio of the continuously variable transmission and the sub-transmission in entirety, the vehicle control method comprising:
controlling a hydraulic pressure required for shifting of the sub-transmission based on an input torque to the sub-transmission during the coordinated shift; and
executing limitation processing in which, when an instruction to execute specific control causing fluctuation in the input torque to the sub-transmission during the coordinated shift is issued, execution of the specific control is prohibited or the specific control is executed by limiting a control amount.

6. A vehicle control device, adapted to control a vehicle, including a continuously variable transmission and a stepped sub-transmission on a power transmission path from a power source to a driving wheel and executing coordinated shift in which, when the sub-transmission is to be shifted, a speed ratio of the continuously variable transmission is changed in a direction opposite to a changing direction of a speed ratio of the sub-transmission and suppressing a change in a speed ratio of the continuously variable transmission and the sub-transmission in entirety, comprising:
hydraulic pressure control means for controlling a hydraulic pressure required for shifting of the sub-transmission based on an input torque to the sub-transmission during the coordinated shift; and
limitation processing means for executing limitation processing in which, when an instruction to execute specific control causing fluctuation in the input torque to the sub-transmission during the coordinated shift is issued, execution of the specific control is prohibited or the specific control is executed by limiting a control amount.

* * * * *